(No Model.) 2 Sheets—Sheet 1.
D. F. GRAHAM.
HORSE HAY RAKE.
No. 395,132. Patented Dec. 25, 1888.
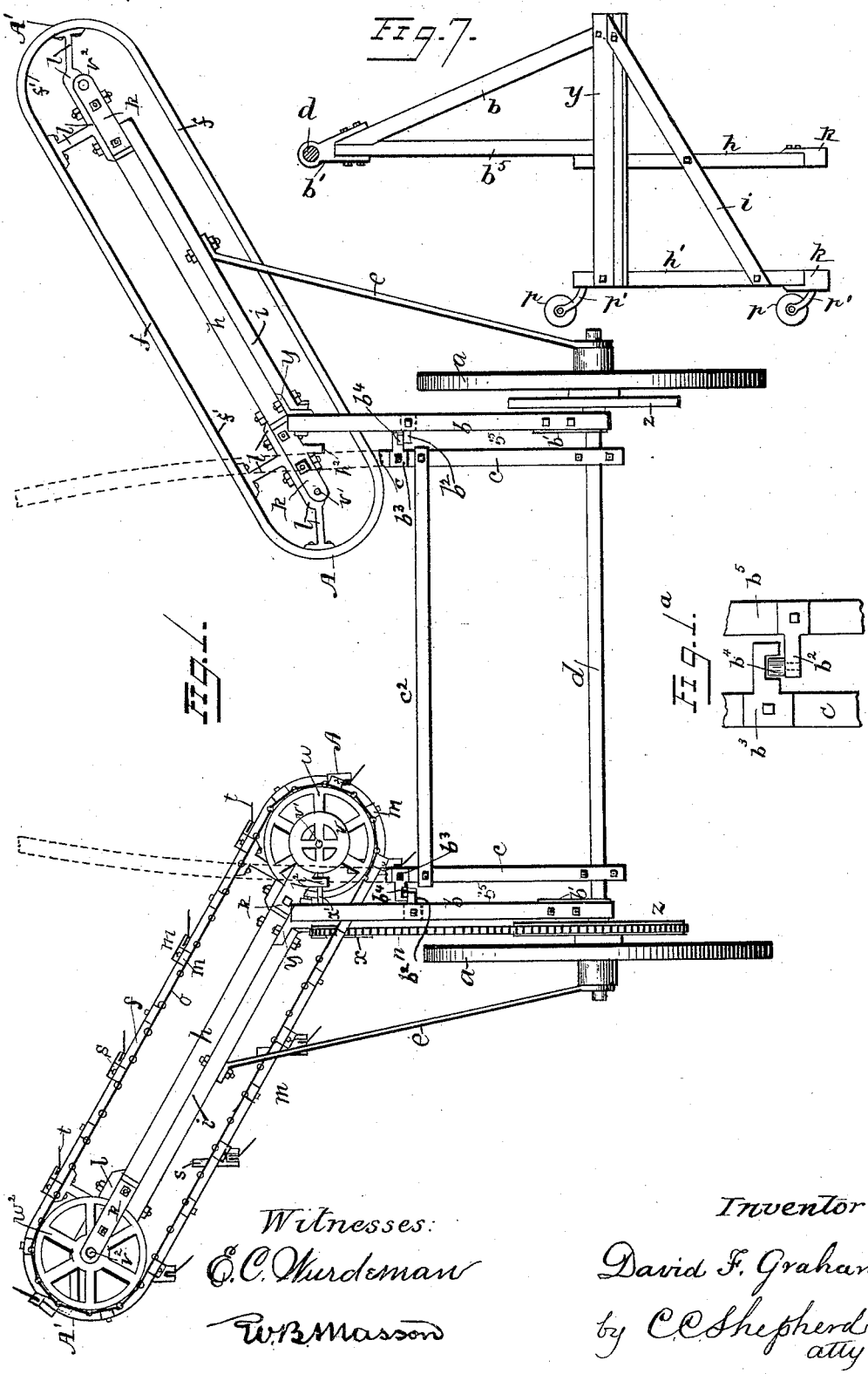
Witnesses:
E. C. Wurdeman
W. B. Masson
Inventor:
David F. Graham
by C. C. Shepherd
atty

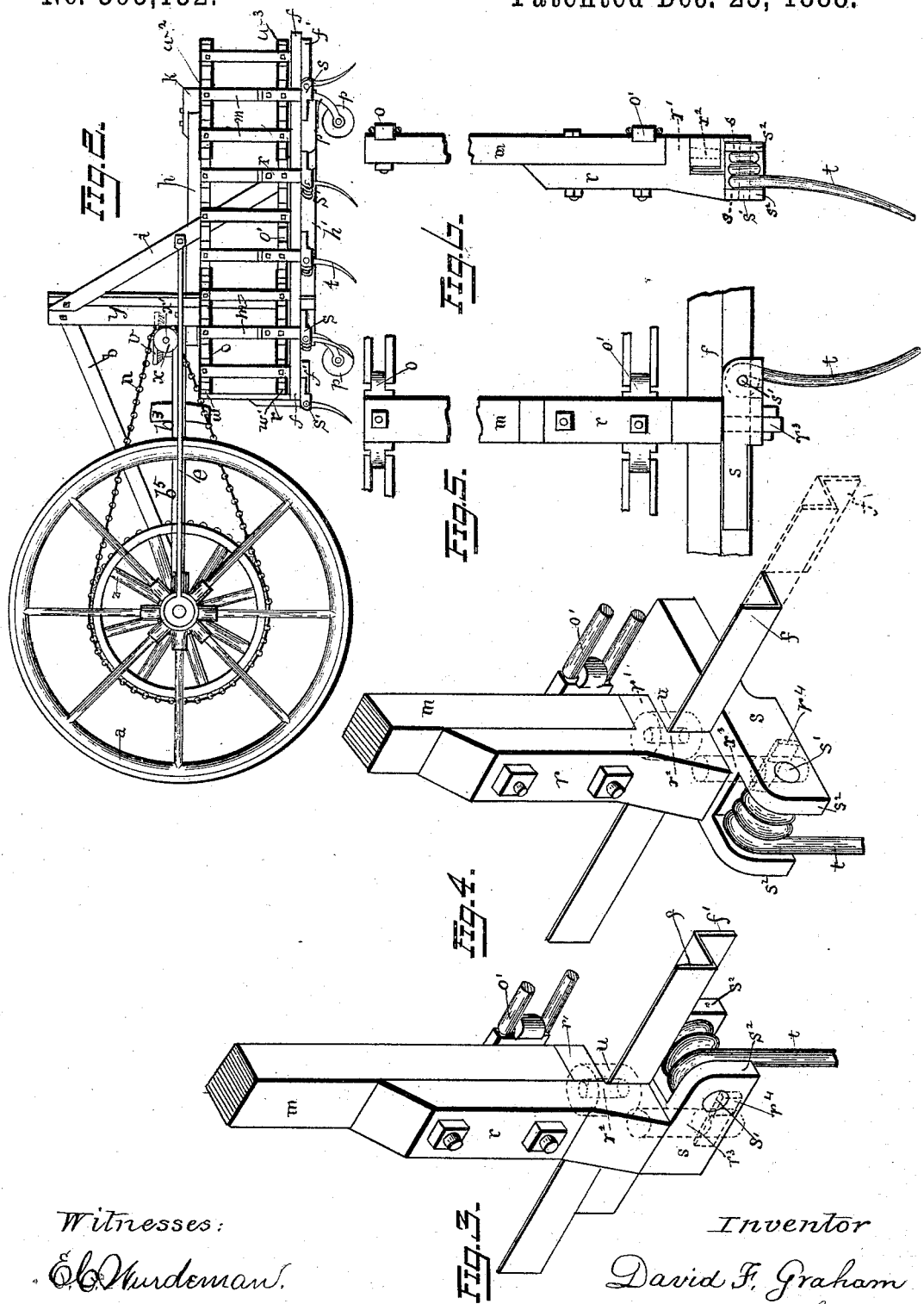

UNITED STATES PATENT OFFICE.

DAVID F. GRAHAM, OF COLUMBUS, OHIO.

HORSE HAY-RAKE.

SPECIFICATION forming part of Letters Patent No. 395,132, dated December 25, 1888.

Application filed October 23, 1885. Serial No. 180,704. (No model.)

*To all whom it may concern:*

Be it known that I, DAVID F. GRAHAM, a citizen of the United States, and a resident of Columbus, in the county of Franklin and State of Ohio, have invented certain new and useful Improvements in Horse Hay-Rakes, of which the following is a specification.

My invention relates to improvements in horse hay-rakes; and the objects of my improvements are, first, to so construct a horse hay-rake as to effectively gather the hay into the form of windrows; second, to so construct said rake as to produce a continuous and easy draft by obviating the necessity of dumping the hay at intervals, as is usually done, and at the same time to produce a clean, narrow, and even windrow. These objects I accomplish in the manner illustrated in the accompanying drawings, in which—

Figure 1 is a plan view of my improved rake with a portion of the mechanism removed from one of the raking-frames. Fig. 1ª is a plan view, on a larger scale, of the parts uniting the arms $b^5$ of the frame to the shafts $c$ of the machine. Fig. 2 is a side elevation of Fig. 1. Fig. 3 is a perspective view of the lower end of one of the tooth-carrying slats, showing a portion of the tooth in position for raking. Fig. 4 is a similar view showing the tooth-block head and tooth released from the flanged track and partly turned out of raking position. Figs. 5 and 6 are front and side views of the slats and tooth-block head. Fig. 7 is a side view of the frame used to support each rake.

Similar letters refer to similar parts throughout the several views.

The carriage or frame-work of my improved rake is constructed in the usual manner, consisting of the wheels $a$, mounted on the axle $d$, carrying the shafts $c$. (Shown broken away.) Said shafts are united by the transverse bar $c^2$. On the axle $d$, between the shafts $c$ and the wheels $a$, are loosely pivoted metal lugs $b'$ $b'$, to which are bolted the rear ends of arms $b$ $b$ and $b^5$ $b^5$, which project forwardly to points beyond the front of the wheels. Each of the arms $b^5$ $b^5$ is bolted at its outer end to one of the outer sides and near the center of a vertical angle-iron, $y$, the arms $b$ $b$ being bolted to points near the tops of said angle-irons. To each of these angle-irons, near the middle of its length, is also bolted a bar, $h$. These bars $h$ extend outwardly from the sides of the frame in a forwardly-oblique line, the inner or rear ends projecting slightly within the inner line of the shafts $c$. To the lower end of each of said angle-irons is similarly secured a bar, $h'$, parallel with the bar $h$. A further connection is made between the bars $h$ $h'$ by means of wooden stays or braces $i$, which are bolted at their lower ends to points near the outer ends of the lower bars, $h'$, and near the center of their length to the upper bar, $h$, their upper ends being bolted to the top portions of the angle-irons $y$. Running from the outer ends of the axle $d$ and loosely pivoted thereto are braces $e$, which, extending forwardly and outwardly, are bolted at their extremities to the bars $h$.

On the axle $d$, between the arms $b^5$ and the wheels $a$, are fixed sprocket-wheels $z$. Each of these sprocket-wheels, by means of a suitable chain belt, $n$, communicates motion to a smaller sprocket-wheel, $x$, fixed on the end of a short shaft, $x'$, which, resting in bearings in the outer end of the arm $b^5$, projects inwardly and passes through a lug, $h^2$, made to project from the bar $h$, and carries on its inner end a small beveled cog-wheel which engages with the cogs on the lower side of a beveled gear-wheel, $v$, fixed on the upper end of a vertical shaft, $v'$. These shafts $v'$, which have their lower bearings in the bearings $k$ in the lower bars, $h'$, and their upper bearings in the bearings $k$ in the upper bars, $h$, carry sprocket-wheels $w$ $w'$, fixed, respectively, at points immediately above and immediately below the lower bars, $h'$, and the upper bars, $h$. Between the outer ends of each pair of bars $h$ $h'$ is loosely pivoted in bearings $k$, secured to said bar, a vertical shaft, $v^2$, each of these shafts $v^2$ carrying sprocket-wheels $w^2$ and $w^3$, corresponding in position and size to the sprocket-wheels $w$ and $w'$. These sprocket-wheels $w$ $w'$ and $w^2$ $w^3$ are adapted to carry continuous chain belts $o$ $o'$, having alternately open and solid links. To the outer sides of the solid links in each of these chain belts $o$ are bolted or riveted the upper ends of vertical slats $m$, which, extending downward, are similarly secured a short distance above their lower ends to corresponding links in the belts $o'$. To the outer side of each of these slats $m$, (or to each alternate slat,) near its lower, end is bolted the upper end of a metal casting, $r$. Said casting, extending downward below the end of the slat, is provided with a downwardly-projecting pin, $r^3$, on which is loosely pivoted the head of an oblong block, $s$, said block also carrying a transverse pin, $s'$, fixed between two outwardly-projecting arms, $s^2$, on the head of the block, on which pin is wound the upper end of a downwardly-projecting curved metal tooth, $t$. The block $s$ is retained upon the pin $r^3$ by means of a key, $r^4$, passing through said pin under said block. Immediately beneath the lower ends of each of the series of slats $m$ is placed an endless metal track, $f$, of angle-iron, having its outer edge flanged upward and its inner edge about one-half its length flanged downward at $f'$ to give a part rotation to the cam-block. This metal track is held in its proper place by means of metal braces $l$, bolted to the inner flanged side, $f'$, of the track and to the lower bar, $h'$. Projecting inwardly from each of the castings $r$, and bearing against the bottom of each of the slats $m$ is, a lug, $r'$, which, projecting over the top of the track $f$, has near its outer end a downwardly-projecting pin, $r^2$, on which is loosely mounted a small guide-wheel, $u$, which is adapted to run against the inner side of the outer flange of the track.

Motion having been communicated to the shaft $v'$, as above described, it is thus transmitted to the sprocket-wheels $w$ $w'$, and thence, through the chain belting $o$ $o'$, having the slats $m$ secured thereto, to the sprocket-wheels $w^2$ and $w^3$ and shafts $v^2$. The motion thus given to the slats $m$ operates to carry the castings $r$ along the track $f$ and cause the teeth $t$ to move forward. The inner flange, $f'$, of the track extends only around the forward or front half of the tracks and is cut away at the point A and continued again at the point A'. The rakes being set in motion, as above described, the curved teeth are kept pointing forward in a position to gather the hay by means of the blocks $s$, which are held in place by their pressure against the outer side of the flange $f'$ of the track $f$, as shown in Fig. 3 of the drawings. When the point A at the inner end of the track is reached, the block $s$ is allowed to escape its bearing against the flange $f'$, and, by pressure of the hay against the tooth, is swung to the rear, thus reversing the tooth, throwing its curved end out of position for raking, as shown in Fig. 4 of the drawings, and allowing the hay which it may have gathered to be deposited at that point. When the point A' is reached, the block again coming in contact with the flange $f'$, it causes the tooth to again assume a raking position. In order to prevent the pressure of the hay against the tooth from pulling the casting away from the track, I provide the guide-pulley $u$, before described. The raking devices above described are supported and kept at their proper height above the ground by means of caster-wheels $p$, pivoted to the lower ends of metal arms $p'$, which project from the lower side of the lower bars, $h'$. The lugs $b'$, being hinged or loosely pivoted to the axle $d$, admit of the rising and falling of the arms $b^5$ $b$ as the caster-wheels $p$ come in contact with high or low ground. In order to produce an easy motion of these parts and to prevent the arms $b^5$ from being pulled outward, I secure, by bolts or otherwise, at convenient points on each of the arms $b^5$, an inwardly-projecting lug, $b^2$, on which is loosely mounted a small guide-wheel, $b^4$, which is adapted to bear and run against the inner side of the flanged edge of a metal plate, $b^3$, made to project outwardly from the shaft $c$.

By the construction and operation of the apparatus herein described, it will readily be seen that the hay within a certain distance from each side of the running-gear will be raked in and deposited in the form of neat and even windrows between the wheels of the carriage, and that an easy and steady draft is obtained by thus obviating the necessity of dumping the hay at intervals.

Having now fully described my invention, what I claim, and desire to secure by Letters Patent, is—

1. A series of raking-teeth carried on either side of the running-gear of a horse hay-rake by blocks $s$, secured to the castings $r$, bolted to the vertical slats $m$, said slats being carried by means of endless chain belts $o$ $o'$, sprocket-wheels $w$ $w'$ $w^2$ $w^3$, fixed on shafts $v'$ $v^2$, having bearings in the bars $h$ $h'$, beveled gear-wheels $v$, small beveled cog-wheels fixed on the ends of short shafts $x'$, having bearings in the bar-lugs $h^2$, and the arms $b^5$, pivoted to the carriage-axle and carrying small sprocket-wheels $x$, operated by the endless chains $n$ from the sprocket-wheels $z$, mounted on the carriage-axle $d$, substantially as and for the purpose specified.

2. The combination of the ground-wheels $a$, their axle, the arms $b$, the vertical angle-irons $y$, and bars $h$, having a journal bearing at each end, with the endless metal track $f$, having a downward flange for half of its length, and an endless chain having vertical slats $m$, pivotally-retained blocks $s$ at the lower ends thereof, and spring-fingers $t$, substantially as and for the purpose described.

3. The combination of the ground-wheels, axle, sprocket-wheels, and chains $n$ with shafts carrying sprocket-wheels $w$ $w'$, an endless chain, its vertical slats $m$, having castings $r$ and friction-rollers $u$ at the lower end thereof, with the endless metal track $f$ and the blocks $s$, pivoted to the castings $r$, substantially as described.

DAVID F. GRAHAM.

Witnesses:
C. C. SHEPHERD,
A. C. WILLIAMS.